United States Patent
Ollinger et al.

(10) Patent No.: US 7,662,758 B2
(45) Date of Patent: Feb. 16, 2010

(54) POLYMERIC POLYOL ESTERS USED IN METALWORKING FLUIDS

(75) Inventors: Christian G. Ollinger, Spartanburg, SC (US); Derek T. Phillips, Moore, SC (US); Frank L. Kroto, Spartanburg, SC (US); Sanjay N. Kalhan, Hudson, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 637 days.

(21) Appl. No.: 11/423,796

(22) Filed: Jun. 13, 2006

(65) Prior Publication Data

US 2007/0287645 A1 Dec. 13, 2007

(51) Int. Cl.
*C10M 171/00* (2006.01)
(52) U.S. Cl. .................................. 508/459
(58) Field of Classification Search ................ 508/459
See application file for complete search history.

(56) References Cited

U.S. PATENT DOCUMENTS

| | | | |
|---|---|---|---|
| 3,697,428 A | 10/1972 | Meinhardt et al. | 252/56 D |
| 5,698,502 A | 12/1997 | Pafford et al. | 508/485 |
| 5,798,322 A | 8/1998 | Brannen et al. | 508/442 |

FOREIGN PATENT DOCUMENTS

| | | |
|---|---|---|
| EP | 0727455 A2 | 8/1996 |
| GB | 665595 | 1/1952 |
| GB | 1215214 | 12/1970 |
| WO | WO 03/080772 | 2/2003 |

OTHER PUBLICATIONS

Search Report of corresponding international application No. PCT/US2007/070020 mailed Dec. 28, 2007.

*Primary Examiner*—Glenn A Caldarola
*Assistant Examiner*—Taiwo Oladapo
(74) *Attorney, Agent, or Firm*—Christopher D. Hilker; David M. Shold

(57) ABSTRACT

Polymeric polyol ester additives for metal working applications are described that have lower pour points and improved solubility in API Group II and III basestocks. The polymeric polyol ester contains linear monocarboxylic acid, alkanedioic acid, alk(en)yl substituted succinic acid or anhydride, trihydric alcohol and pentaerythritol.

15 Claims, No Drawings

POLYMERIC POLYOL ESTERS USED IN METALWORKING FLUIDS

FIELD OF THE INVENTION

Polymeric polyol ester additives having compatibility with paraffinic mineral oil basestocks (hydrotreated) and usefulness in metalworking applications are described. While these polymeric polyol ester molecules are generally free of phosphorus, sulfur, and other heteroatoms (other than oxygen, carbon, and hydrogen) they can be part of an additive package that includes sulfurized hydrocarbons and phosphorus containing antiwear or extreme pressure additives.

BACKGROUND OF THE INVENTION

Metalworking operations include for example, rolling, forging, hot-pressing, blanking, bending, stamping, drawing, cutting, punching, spinning and the like and generally employ a lubricant to facilitate the operation. Lubricants generally improve these operations in that they can provide films of controlled friction or slip between interacting metal surfaces and thereby reduce the overall power required for the operations, and prevent sticking and decrease wear of dies, cutting bits and the like. Sometimes the lubricant is expected to help transfer heat away from a particular metalworking contact point.

Metal working fluids often comprise a carrier fluid and a multitude of specialty additives. The carrier fluid imparts some general lubricity to the metal surface and carries/delivers the specialty additives to the metal surfaces. Additionally, the metal working fluid may provide a residual film on the metal part thereby adding a desired property to the metal being processed. The specialty additives can impart a variety of properties including friction reduction beyond hydrodynamic film lubrication, metal corrosion protection, extreme pressure or antiwear effects, etc.

Carrier fluids include various petroleum distillates including American Petroleum Institute Group I-V basestocks and/or water. Group I basestocks are primarily direct fractional distillation products of petroleum. Group II and III basestocks are further refined petroleum products such as hydrotreated distillation products that have reduced amounts of unsaturation (e.g. less than 1 wt %) and cyclic distillation products. The specialty additives can exist within the carrier fluid in a variety of forms including as dissolved, dispersed in, and partially soluble materials. Some of the metal working fluid may be lost to or deposited on the metal surface during the working process; or may be lost to the environment as spillage, sprays, etc; and may be recyclable if the carrier fluid and additives have not degraded significantly during use. Due to entry of a percentage of the metal working fluid into process goods and industrial process streams, it is desirable if the components to the metal working fluid are eventually biodegradable and pose little risk of bioaccumulation to the environment.

Polymeric polyol esters exhibit compatibility with and some solubility with both hydrocarbon oils and water carrier fluids, depending on molecular structure, molecular weight etc. The polymeric polyol esters are biodegradable and if they do not contain other heteroatoms pose little risk of bioaccumulation. Polymeric polyol esters from pentaerythritol are known as additives for metalworking but suffer from compatibility problems at some temperatures with some lubricant basestocks materials.

SUMMARY OF THE INVENTION

The present invention relates to a polymeric polyol ester additive for metal working comprising
a) about 30 to about 60 wt % repeating units from a substantially linear monocarboxylic acid having from 12 to 20 carbon atoms,
b) about 5 to about 30 wt % repeating units from an alkanedioic acid having from 4-6 carbon atoms,
c) about 25 to about 35 wt % repeating units from a alk(en)yl substituted succinic acid or its anhydride wherein said alk(en)yl group is an alkyl or alkenyl group, optionally branched having from 21 to 200 carbon atoms,
d) about 6 to about 18 wt % trihedral alcohol; and
e) about 3 to about 12 wt % repeating units from pentaerythritol.

The use of an alk(en)yl substituted succinic acid or anhydride with a high molecular weight is desirable because it.

Further, polymeric polyol esters with improved solubility characteristics and lower acid numbers can be prepared using a portion of a trihydric alcohol like trimethylolpropane to replace a portion or all of the of pentaerythritol in a polymeric polyol ester used as a lubricant additive for metalworking. Incorporation of trimethylolpropane as a partial or complete replacement for pentaerythritol in a polymeric polyol ester results in enhanced solubility.

Another benefit of partial or complete replacement of pentaerythritol is that lower acid numbers are obtained in these particular polymer formulations when trimethylolpropane is part or all of the total polyol charge. Typically in polyol esters of this type made with pentaerythritol as the sole polyol, the acid numbers are about 20 mgKOH/g of additive. When trimethylolpropane replaces about 50 mole percent of the pentaerythritol under the same reaction conditions, the acid number can readily be reduced to less than 8 mgKOH/g and more desirably less than 5 mgKOH/g. When trimethylolpropane replaces all of the polyol, the acid number can go below 5 mgKOH/g and more desirably less than 3 mgKOH/g. Higher acid numbers are undesirable to the extent that they promote coupling of polymer chains, which can significantly reduce the solubility of polymeric polyol esters in hydrocarbon oils.

DETAILED DESCRIPTION OF THE INVENTION

The polymeric polyol ester contains linear monocarboxylic acid units derived from alkanedioic acid, alk(en)yl substituted succinic acid or anhydride, trihydric alcohol and pentaerythritol. The polymeric polyol ester is made from the following components. The first is a generally linear monocarboxylic acid where R is an alk(en)yl group of 11 to 19 carbon atoms.

The second is an alkanedioic acid such as adipic acid shown below.

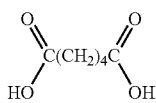

The third is an alk(en)yl substituted succinic acid or its anhydride where $R_1$ has from 21 to 200 carbon atoms.

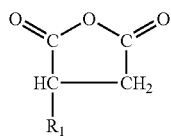

The fourth is a trihydric alcohol and in the one embodiment is trimethylolpropane as shown below.

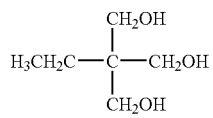

Optimally, a fifth component when present is pentaerythritol as shown below.

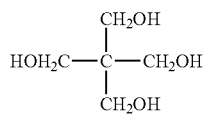

The fifth component in embodiment A is not present in any substantial amount in embodiment B.

When these components are reacted, they form a polymeric polyol ester as described in embodiment A and shown below. A variety of isomeric variations therefrom with more numerous side chain branches is anticipated rather than a strictly linear structure as shown.

embodiment B including about 90-100 percent trihydric alcohol based on the polyhydric alcohol component. The inclusion of pentaerythritol is the major difference between embodiment A and embodiment B.

The first component in the polymeric polyol ester is a substantially linear monocarboxylic acid having from about 12 to about 20 carbon atoms. Examples of these acids are coco fatty acid, tall oil fatty acid and the like. These acids have some paraffinic nature and are thought to therefore favorably interact with the highly linear paraffinic oils of the Group TI and Group III basestocks. Since this component is monofunctional in the condensation polymerization, larger amounts of it may minimize the molecular weight. In embodiment A these (repeating units derived from monocarboxylic acids) are present in amounts from about 30 to 60 wt %, more desirably from about 30 to about 50 wt %, and preferably from about 40 to about 45 wt % based on the weight of all the components in the polymeric polyol ester. In this disclosure repeating unit will be used to describe the acid, diacid, or polyol component to a repeating unit, while a more academic approach might require a repeating unit to include both an acid component and an alcohol component. By repeating unit of mono acids, it is meant the units derived from the mono acids, specifically the atoms delivered by the mono acid. The weight percentage is the sum of atoms delivered by that repeating unit and as derived from the repeating mono acid, diacid or polyol of the polyol ester. In embodiment B the amounts of linear monocarboxylic acids will be from about 10 to about 90 wt % and more preferably from about 25 to about 55 wt %.

The second component is an alkanedioic acid having from 4 to 6 carbon atoms. A preferred alkanedioic acid is adipic acid. This component is primarily a chain extender for the formation of the polyol ester. The alkanedioic acid is desirably present in embodiment A in an amount from about 5 to about 30 wt %, more desirably from about 5 to about 15 wt %, and preferably from about 7 to about 15 wt % based on all of the repeating units in the polymeric polyol ester. The alkanedioic acid is desirably present in embodiment B in an amount from about 5 to about 30 wt % and more desirably from about 5 to about 15 wt % based on all of the repeating units in the polymeric polyol ester.

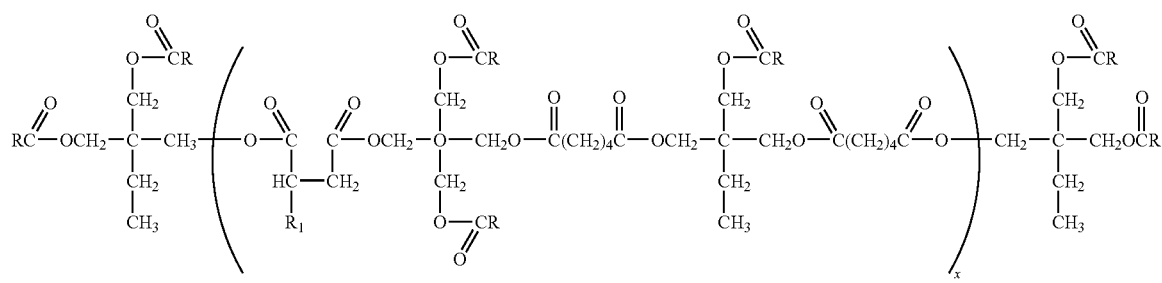

The polymeric polyol ester is manufactured from four or five different components depending on whether one is making embodiment A including about 50-60 percent trihydric alcohol based on the polyhydric alcohol components or The third component is an alk(en)yl substituted succinic acid or its anhydride. Alk(en)yl is shorthand for the term alkyl or alkenyl with alkenyl varying from alkyl by the inclusion of one or more carbon to carbon double bonds in the molecule fragment. While unsaturation is not particularly desirable in the alk(en)yl substituted succinic acid or its anhydride, it is understood that some unsaturation may be presence due to the chemical reactions used to form the alk(en)yl substituted succinic acid reactant. The alk(en)yl group desirably has from about 21 to about 200 carbon atoms so the entire molecule has about 25 to about 205 carbon atoms along with the respective amount of hydrogen and oxygen atoms. A preferred alk(en)yl group would include one with one or more aliphatic branches and a desirable example would be polymerized isobutylene group resulting in polyisobutylene succinic anhydride. While the anhydride of succinic acid is listed, it is understood that in the final polymer the anhydride has opened to appear in the polyol ester as the esterification product of alk(en)yl succinic acid. Desirably the alk(en)yl succinic acid or its anhydride is present in embodiment A as repeating units in the polymeric polyol ester as from about 25 to about 35 wt %, more desirably from about 28 to about 32 wt %, and preferably from about 30 to about 31 wt % based on all of the repeating units therein. Desirably the alk(en)yl succinic acid or its anhydride is present in embodiment B as repeating units in the polymeric polyol ester as from about 1 to about 50 wt %, more desirably from about 20 to about 45 wt %, and preferably from about 25 to about 35 wt %.

The fourth component is the trihydric polyol. While a variety of trihydric alcohols could be used having from about 4 to 10 carbon atoms, trimethylolpropane is preferred due to the chemical stability of polyol esters made from trimethylolpropane relative to other trihydic alcohols. Desirably in embodiment A the trihydric alcohol is present from about 6 to about 18 wt %, more desirably from about 8 to about 12 wt % in the repeating units, and preferably from about 9 to about 10 wt % based on all of the repeating units. Desirably in embodiment B the trihydric alcohol is present from about 5 or about 10 to about 30 wt % in the repeating units and more desirably from about 5 to about 15 wt % based on all of the repeating units.

The fifth component, pentaerythritol, is only present in embodiment A and not present intentionally in embodiment B. Pentaerythritol has the structure already shown. It is preferred over other tetrahydric alcohols because the particular structure with the (central) beta carbon from all the oxygen atoms of the hydroxyl groups lacks any attached hydrogen atoms. This helps prevent some chemical reactions that occur when the beta carbon from a hydroxyl group has a hydrogen atom(s) that can be abstracted. While pentaerythritol is generally defined by the formula given, it is well known that commercial sources of pentaerythritol generally include some amounts of dimer, trimer and higher oligomers from coupling pentaerythritol. For the purposes of this application and the claims the term pentaerythritol will include the generally commercially acceptable forms thereof that include some dimer, trimer, etc. Pentaerythritol is desirably present in embodiment A in an amount from about 3 to about 12 wt %, more desirably about 5 to about 8 wt % and preferably about 7 to about 8 wt %.

The polymeric polyol ester can be present in a metal working from trace amounts to large amounts depending upon the application. In most conventional applications the use rate would be about 0.05 to about 50 wt % and more desirably from about 0.1 to about 25 wt % of this polymeric polyol ester in a hydrocarbon diluent oil. This particular polymeric polyol ester can be used with a wide variety of natural and synthetic oils that might be useful in metal working applications. This particular polymeric polyol ester has a lower pour point than polymeric polyol esters from pentaerythritol alone and similar acids and thus is more easily handled and measured at lower temperatures (requires no heating or less heating to achieve pumpable neat viscosities).

The molecular weight of this polymeric polyol can be adjusted to achieve optimal solubility and compatibility with other components in the metal working fluid (e.g. the diluent oil). The weight average molecular weight can vary from about 10,000 to about 1,000,000 for most applications and more desirably from about 20,000 to about 500,000. To achieve maximum solubility polymeric polyol esters often have weight molecular weights controlled to about 20,000 to about 100,000. Acid number and hydroxyl number of the polymeric polyol ester are influenced by the molecular weight. In this application neither a large excess of residual hydroxyl nor acid groups is desirable. Thus the stoichiometry of the acid groups and hydroxyl groups is near equivalent and might be expected to vary by 1, 2, or 3 mole percent up to 10 mole percent. Acid numbers of less than 20 and more desirably less than 10, 8, 5 or 3 mg KOH/g polymer are preferred by the industry but higher acid numbers would not necessarily preclude use as a metal working additive.

These polymeric polyol esters can be made with a variety of processes known in the art. Since it is a condensation polymerization it is desirable to purge water out of the reactants to push the condensation reaction towards completion. A diluent may be used. A suggested procedure used to make these includes mixing the reactants in a stirred reactor under an inert gas such as nitrogen and at a temperature of about 240 to about 255 C until the acid number is acceptable (e.g. normally the reaction was stopped at an acid number between 3-8 mgKOH/g of polymer). This typically was about 6 to about 8 hours using the reactants of embodiment A.

The polymeric polyol ester need not be the only additive in a metal working fluid. These additives work well with phosphorus and/or sulfur containing extreme pressure (EP) additives. The polymeric polyol esters can function as a partial EP replacement for chloroparaffin EP additives when used with a sulfur and/or phosphorus EP additives. The polymeric polyol esters work well with the organic phosphorus compounds listed in U.S. Pat. No. 5,798,322 as additives for metal working in combination with the polymeric polyol ester additives in that patent. U.S. Pat. No. 5,798,322 is hereby incorporated by reference for its teachings on metal working formulation in general and its teachings on additives/variations on formulations using polymeric polyol ester additives.

SPECIFIC EMBODIMENT

The following example(s) demonstrate the present invention:

Example of Polymeric Polyol Ester

A glass reactor equipped with a stirrer, thermometer, nitrogen inlet and water-trap connected to a condenser was charged with about 8.0 equivalents coconut fatty acid, about 2.4 equivalents 1000 Mn polyisobutylene succinic anhydride, about 8.3 equivalents monopentaerythritol, about 8.3 equivalents trimethylolpropane, about 5.8 equivalents adipic acid, and about 0.1 wt % of hypo phosphorous acid. The reaction mixture was heated to about 180° C. for about 2 hours while removing water of reaction. After holding for about 2 hours, the reaction temperature was increased to about 240 to 245° C. and maintained at that temperature while removing water of reaction until the total acid number was less than about 5 mg KOH/g and the kinematic viscosity @100° C. was between about 250 to 400 cSt. (total reaction time is typically 16 to 24 hours).

To verify the above polymeric polyol ester has excellent oil solubility, the ester was blended with various Group II and III base mineral oils at 10 wt % in oil. The appearances of the blends were evaluated at ambient temperature and were found to be clear and homogeneous after 1 day, 1 month, and 1 year.

To verify, the above polymeric polyol ester provides lubrication properties while maintaining excellent oil solubility, a soluble oil was made that comprised the following: about 10 wt % polymeric polio ester, 17 wt % Soluble Base GT-1900S (soluble oil emulsifier base commercially produced by Lubrizol Metalworking Additives) and about 73 wt % 100 SUS naphthenic oil. Two additional soluble oils were made for comparison purposes. One soluble oil was a basic soluble oil: about 17 wt % Soluble Base GT-1900S and 83 wt % 100 SUS naphthenic oil. The other soluble oil contained a typical ester, trimethylolpropane trioleate (TMP-TO), used in cutting fluids to improve lubrication properties: about 10 wt % trimethylolpropane trioleate, about 17 wt % Soluble Base GT-1900S and about 73 wt % 100 SUS naphthenic oil. Macroemulsions of all three soluble oils were then formed by diluting the above soluble oil blends in tap water at a ratio of 1:20. The resulting emulsions were then tested for its lubricity properties by a Microtap Megatap TI (manufactured by Microtap USA, Inc.), a lab bench tool used for comparative analysis of cutting fluid efficiencies. For all three fluids, M6×1HSS (6 mm with 1 mm pitch, high speed steel) forming taps were used on a 6061 Aluminum bar with 5.50 mm diameter holes. The holes of the 6061 Aluminum bar were tapped at a rate of 660 rpm. The relative efficiencies were then determined on the three fluids normalizing the best performing fluid to 100% efficiency. Below were the results:

| Emulsion of Soluble Tested | Relative Efficiency (%) |
|---|---|
| Basic soluble oil | 64.8 |
| Soluble oil containing TMP-TO | 88.9 |
| Soluble oil containing polymeric polyol ester | 100 |

The results demonstrate that the soluble oil containing the polymeric polyol ester showed a significant (at a 95% level) improvement over both the basic soluble oil and the soluble oil containing TMP-TO.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word {about.} Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. While ranges are given for most of the elements of the invention independent of the ranges for other elements, it is anticipated that in more preferred embodiments of the invention, the elements of the invention are to be combined with the various (assorted) desired or preferred ranges for each element of the invention in various combinations. As used herein, the expression {consisting essentially of} permits the inclusion of substances that do not materially affect the basic and novel characteristics of the composition under consideration.

What is claimed is:

1. A polymeric polyol ester additive for metal working comprising
   a) about 30 to about 60 wt % repeating units from a substantially linear monocarboxylic acid having from 12 to 20 carbon atoms,
   b) about 5 to about 30 wt % repeating units from an alkanedioic acid having from 4-6 carbon atoms,
   c) about 25 to about 35 wt % repeating units from a alk(en)yl substituted succinic acid or its anhydride wherein said alk(en)yl group is an alkyl or alkenyl group, optionally branched having from 21 to 200 carbon atoms,
   d) about 6 to about 18 wt % repeating units from trihedral alcohol, and
   e) about 3 to about 12 wt % repeating units from pentaerythritol.

2. The composition of claim 1, wherein said polymeric polyol ester molecule is substantially free of phosphorus atoms and sulfur atoms.

3. The composition of claim 1, wherein the amount of repeating units from monocarboxylic acid is from about 30 to about 60 wt %.

4. The composition of claim 1, wherein the amount of repeating units from alk(en)yl substituted succinic acid or its anhydride is from about 28 to about 32 wt %.

5. The composition of claim 1, wherein the amount of repeating units from said alkanedioic acid is from about 5 to about 15 wt %.

6. The composition of claim 1, wherein the amount of repeating units from trihydric alcohol is from about 8 to about 12 wt % and the amount of repeating units from pentaerythritol is from about 5 to about 8 wt %.

7. The composition of claim 1 diluted to 0.05 to about 50 wt % in at least about 50 wt % of a Group II or Group III basestock as defined by the American Petroleum Institute.

8. The use of a composition according to claim 7 as a metal working fluid lubricant between interacting metal surfaces in a metal working fluid including at least one step of stamping, cutting and/or bending one of said metal surfaces.

9. The composition of claim 7 further comprising any combination of lubricating additives, extreme pressure additives, corrosion inhibitor additives or combinations thereof.

10. The composition of claim 1, wherein said polymeric polyol ester has a number average molecular weight from about 10,000 to about 1,000,000.

11. The composition of claim 1, wherein at least about 50 wt % of said monocarboxylic acid is a coco fatty acid or tall oil fatty acid, at least about 50 wt % of said alk(en)yl substituted succinic acid or its anhydride is a isooctadecyl succinic acid or anhydride, at least about 50 wt % of said akanedioic acid is adipic acid, and at least 50 wt % of the trihydric alcohol is trimethylolpropane.

12. The composition of claim 1, wherein the amount of repeating units from monocarboxylic acid is from about 25 to about 55 wt %.

13. The composition of claim 1, wherein the amount of repeating units from alk(en)yl substituted succinic acid or its anhydride is from about 25 to about 30 or about 35 wt %.

14. The composition of claim 1, wherein the amount of repeating units from trihydric alcohol is from 5 to about 15 wt %.

15. The composition of claim 1 diluted to 0.05 to about 50 wt % in at least about 50 wt % of a Group II or Group III basestock as defined by the American Petroleum Institute and wherein said polymeric polyol ester has a weight average molecular weight from about 10,000 to about 1,000,000.

* * * * *